United States Patent [19]

Solheim et al.

[11] Patent Number: 5,675,081
[45] Date of Patent: Oct. 7, 1997

[54] ATMOSPHERIC WATER VAPOR SENSING SYSTEM USING GLOBAL POSITIONING SATELLITES

[75] Inventors: Frederick Stuart Solheim; Randolph H. Ware, both of Boulder, Colo.

[73] Assignee: University Corporation for Atmospheric Research, Boulder, Colo.

[21] Appl. No.: 566,841

[22] Filed: Dec. 4, 1995

[51] Int. Cl.$^6$ ............................................. G01W 1/00
[52] U.S. Cl. ..................... 73/170.28; 73/29.01; 324/640
[58] Field of Search .................... 73/170.16, 170.28, 73/170.27; 364/420, 449, 447; 324/640

[56] References Cited

U.S. PATENT DOCUMENTS

| | | | |
|---|---|---|---|
| 4,310,884 | 1/1982 | Roberts et al. | 364/449 |
| 4,463,357 | 7/1984 | MacDoran | 343/460 |
| 4,613,864 | 9/1986 | Hofgen | 364/449 |
| 5,065,615 | 11/1991 | Hill | 73/29.01 |
| 5,428,358 | 6/1995 | Gardner | 364/420 |
| 5,526,676 | 6/1996 | Solheim et al. | 324/640 |

*Primary Examiner*—Richard Chilcot
*Assistant Examiner*—Ronald Biegel
*Attorney, Agent, or Firm*—Duft, Graziano & Forest, P.C.

[57] ABSTRACT

An atmospheric water vapor sensing system using Global Positioning Satellites (GPS) to determine the refractivity and Slant-path Water Vapor (SWV) between an Earth-based GPS receiver and a plurality of satellite-based GPS transmitters. Either the refractivity measure or the SWV measure can be input directly into weather forecasting models. SWV is the integrated atmospheric water vapor in a column of atmosphere at an acute angular line-of-sight path between the Earth-based GPS receiver and any one of the plurality of satellite-based GPS transmitters. SWV sensing facilitates atmospheric soundings over land and water to provide global scale high resolution atmospheric tomography for use in operational meteorology and meteorological forecasting.

31 Claims, 4 Drawing Sheets

5,675,081

ATMOSPHERIC WATER VAPOR SENSING SYSTEM USING GLOBAL POSITIONING SATELLITES

GOVERNMENT FUNDED INVENTION

This invention was made with Government support under Agreement No. ATM-9209181 awarded by the National Science Foundation. The Government has certain rights in this invention.

FIELD OF THE INVENTION

This invention relates to high resolution meteorology and in particular to an atmospheric water vapor sensing system using global positioning satellites to remotely sense slant-path water vapor for use in monitoring and forecasting atmospheric conditions on a local, regional, and global scale.

PROBLEM

It is a problem to provide a reliable, inexpensive, and automated high resolution meteorological system to continuously monitor and forecast atmosphere conditions on a local, regional, and global scale. Providing such a meteorological system requires the ability to detect and quantify critical atmospheric constituents involved in Earth's hydrologic process. Three critical atmosphere constituents are based on water in its various forms including liquid (water), solid (ice) and gas (vapor). Although at any one time approximately 99% of the Earth's water is in liquid and solid form, water vapor is one of the most important and highly variable of the atmospheric constituents that act over a wide range of temporal and spatial scales. Water vapor is important because its existence and distribution throughout the atmosphere is a primary factor behind atmospheric weather systems and the Earth's energy balance. For example, water can only be transported on a global scale in its vapor form, all the while carrying with it enormous quantities of energy as it constantly moves from where there is much to where there is little.

Many factors including pressure, temperature, and a water source can determine the quantity of water vapor in the atmosphere. For example, water vapor exists in varying amounts in the atmosphere ranging from at or near 0% to at or about 4% by volume depending on the temperature and availability of liquid water. Water vapor content is also highest in moist and/or low pressure regions and lowest in arid and/or high pressure regions. Further, only a certain maximum volume of water vapor is possible per volume of air depending on the temperature. As the air warms and/or pressure decreases, the maximum possible water vapor content increases. Alternatively, as the air cools and/or the pressure increases, the water vapor content decreases. Once the maximum water vapor content is reached for any given temperature, also known as the saturation threshold, the excess water vapor is released as condensation and/or precipitation in the form of rain or ice.

Existing methods for detecting and quantifying water vapor are undesirable because they can only be implemented on a local scale over land thereby leaving vast gaps in global meteorological continuity. The largest gaps occur over oceans where most atmospheric conditions originate. Although the existing atmospheric sensing systems listed below exhibit high resolution capabilities on a local scale, it is not practical to deploy such systems on a global scale because they are expensive to implement or maintain on a global scale and they lack adequate temporal and/or spatial resolution for realistic use on a global scale.

The radiosonde, an expendable balloon-borne instrument package that relays temperature, humidity, and pressure data to a ground receiver by radio signals, is the traditional cornerstone of the worldwide operational weather analysis and prediction system through deployments twice daily at several hundred sites around the world. However, the twice daily radiosonde deployments are primarily over land and are sparsely distributed due to cost considerations. For these reasons, radiosonde data is too costly and localized to support high resolution global meteorology.

Commercial air carriers presently provide real-time wind, pressure, temperature, and humidity readings around the world as part of a system called Aeronautical Communications Addressing and Reporting System (ACARS). Although the ACARS system provides about 10,000 readings per day world wide at a cost about 100 times less than the recurring cost of radiosondes, the vast majority of ACARS readings are around airports and along common flight paths at established cruise flight levels which limits the spatial scope of this otherwise valuable data.

Earth-based Differential Absorption Lidar (DIAL) and Raman Lidar systems are used to provide wind and water vapor profiles in remote areas. However, such systems are not economic to install and maintain, they do not penetrate cloud cover, and the lasers used are highly energized and are therefore not eye-safe.

Water vapor radiometers are instruments that measure microwave energy emitted by the atmosphere to estimate zenithal integrated water vapor. Integrated water vapor is a measure of the depth of liquid water that would result if a column of water vapor were condensed into liquid water. Zenithal integrated water vapor, also known as Precipitable Water Vapor (PWV), is the integrated water vapor in a vertical column directly overhead an Earth-based measuring device. Earth-based upward-looking water vapor radiometers estimate PWV by measuring radiative brightness temperatures against the cold background of space. However, upward-looking water vapor radiometers must be "tuned" to local conditions using independently obtained PWV data, and although they generally exhibit good temporal resolution in relatively clear atmospheric conditions, they provide only localized PWV over land. Further, unless properly equipped upward-looking radiometers are virtually useless in rain. Alternatively, satellite-based downward-looking radiometers perform well over water and consistent temperature land masses by viewing microwave emissions from the atmosphere and underlying Earth's surface. However, although downward-looking radiometers generally exhibit good spatial resolution they exhibit poor temporal resolution and perform poorly over most land masses. In either case, water vapor radiometers as a whole are not practical for global scale meteorology due to their cost, limited view, and performance characteristics.

Fourier Transform Infrared Radiometer (FTIR) systems can provide high resolution satellite-based and Earth-based temperature and water vapor profiles by using a recursive solution of the radiative transfer equation to provide a vertical profile from the ground up. Although this method can provide vertical resolution of several hundred meters to a kilometer in the lower troposphere, the system exhibits poor performance in the presence of cloud cover and infra-red active gases such as tropospheric ozone.

Unmanned Air Vehicles (UAV's) provide high resolution data in regions inaccessible to other systems discussed above. However, unmanned aircraft are too costly for continuous global sensing, they lack adequate spatial and temporal resolution and are typically only justified in specialized research applications.

Remotely sensing zenithal PWV is possible using a technique based on a Global Positioning Satellite (GPS) surveying method developed for geodetic research. The GPS network used to sense PWV includes a constellation of 21 active satellites and 3 spares in six precise orbital planes over the Earth at high altitudes at or about 20,000 km. The GPS network also contains an array of hundreds of Earth-based GPS receivers deployed world wide. Each GPS satellite transmits two radio signals to provide the precise time and satellite position. A GPS receiver receiving signals from at least 3 GPS transmitters can determine its precise location on the Earth. The GPS system was developed for navigation, time transfer, and later demonstrated as a tool for highly accurate surveying. For surveying applications, geodesists and geophysicists undertook the task of improving GPS accuracy by estimating the extent to which signals propagating from GPS satellites to Earth-based GPS receivers were delayed due to atmospheric parameters. Meteorologists and atmospheric scientists subsequently determined that the "error" the geodesists and geophysicists removed from a GPS signal was in fact valuable meteorological information. The signal delay can be parameterized in terms of a predictable hydrostatic delay and a variable wet delay that exhibits wide temporal and spatial variation. By combining independently obtained surface temperature and pressure observations, the GPS "error" data was transformed into an estimate of the PWV.

The existing technique for atmospheric sensing using the GPS system is limited primarily due to the assumption of atmospheric symmetry, minimal error compensation, and zenith-only PWV estimations over land masses. Further, the PWV measurement at any given GPS receiver is in fact an estimation based on an average of PWV observations over time. The zenith-only limitation is among the most important of the limitations because approximately 75% of the Earth's surface is water and the majority of the atmospheric conditions affecting a land mass are generated over water. Thus, the existing zenith-only PWV technique is not a true global system because it is blind to atmospheric conditions developing and/or approaching from off-shore. In addition, assuming atmospheric symmetry precludes measurement of structure in the water vapor field near a given Earth-based GPS receiver, knowledge of such structure would benefit forecasting models.

The GPS system can also be used to produce high resolution atmospheric tomography by integrating the PWV measurements from Earth-based GPS receivers with radio occultation measurements from at least one Low Earth Orbiting (LEO) satellite. Atmospheric tomography is an accurate vertical profile of structure in the atmosphere constructed from water vapor measurements gathered at points within the atmosphere where a zenithal GPS signal received by an Earth-based GPS receiver intersect with a horizontal GPS signal received by a LEO. A LEO satellite orbits the Earth faster than the higher orbit GPS satellites so that a GPS signal received by a LEO satellite transects the Earth's atmosphere in the moments prior to the GPS signal being eclipsed by the Earth. The transecting GPS signal slices the atmosphere along a long horizontal limb path, thereby revealing important structural information because the signal is subject to a time series of Doppler shifts due to the refractive index of the atmosphere. However, one disadvantage with the radio occultation technique is that it produces only periodic soundings that occur at different points around the Earth due to the difference in LEO and GPS satellite orbital periods. Another disadvantage is that soundings using the radio occultation technique are limited in spatial usefulness because the long horizontal limb path measurements are smeared along at least a 200 km horizontal section of the atmosphere with relatively few intersecting zenithal PWV soundings therebetween for reference points.

For the reasons stated above, existing atmospheric water vapor sensing systems are inadequate on a global scale. There exists a need for a water vapor sensing system that is highly accurate regardless of adverse meteorological conditions, compensates for estimation errors, and accounts for atmosphere asymmetry while supporting operational forecasting of atmospheric conditions on a global, regional, and local scale over land and water. This need has heretofore not been satisfied.

SOLUTION

The above described problems are solved and a technical advance achieved in the field by the atmospheric water vapor sensing system of the present invention using the GPS system. GPS signals from existing satellite-based GPS transmitters are received by standard dual frequency Earth-based GPS receivers in a manner well known and practiced in the art. The GPS signals are received at an acute angle relative to the local geometric horizon and are processed in a novel manner that determines the excess path delay of a GPS signal along the elevated propagation path or "slant-path" between a satellite-based GPS transmitter and an Earth-based GPS receiver. The total refractivity-induced signal delay along the slant-path can be determined from the excess path delay. The refractivity measurements yield high temporal resolution atmospheric conditions in all weather conditions, and the measurements can be input directly to a weather forecasting model. Alternatively, a further determination can be made of the total integrated water vapor along the slant-path based on the previously determined refractivity measurement. The total integrated water vapor along a slant-path is called Slant-path Water Vapor (SWV) and SWV can also be input directly into a weather forecasting model. The refractivity measurements are the preferred input variables to the weather forecasting models.

The SWV measuring technique is based on the principle that electromagnetic radiation such as a radio or microwave transmission is refracted and retarded as it passes through the atmosphere. The refraction causes a "path delay" in the GPS signal induced by atmospheric parameters including water vapor. The path delay directly relates to the present atmospheric temperature, pressure, and water vapor local to the slant-path of the GPS signal. Factoring many refractivity or SWV measurements directly into weather forecasting models provides valuable information regarding present and future atmospheric conditions on local, regional, and global scales.

Reliable SWV measurements require exact positioning of high precision transmitters and receivers with stable high frequency signals therebetween. Although stable high frequency signals are globally available from any number of existing satellite-based sources including, but not limited to, communications, radio, television, and radar networks, the GPS system is the preferred signal source because it is a highly reliable network to highly stable satellite-based transmitters already in place and designed for complete global coverage.

In one embodiment based on the existing network to satellite-based GPS transmitters and an Earth-based GPS receiver capable of measuring SWV, multiple acute angular soundings can be made relative to and below Earth's geometric horizon to accurately determine atmospheric water vapor content local to a single Earth-based GPS receiver in addition to determining it an atmospheric structure is approaching or retreating relative to the Earth-based GPS receiver position. The same number of soundings over the same area would require a plurality of Earth-based GPS receivers using the existing zenithal PWV estimation technique even if supplemented with the radio occultation technique. In another embodiment based on the existing network of satellite-based GPS transmitters and an array to Earth-based GPS receivers each capable of measuring SWV, atmospheric tomography is available over the array at points where a slant-path GPS signal received by one Earth-based GPS receiver in the array intersects with a slant-path GPS signal received by another Earth-based GPS receiver in the array. In still another embodiment, a robust global atmospheric tomography is possible by augmenting the SWV measuring technique over an array to Earth-based GPS receivers with the radio occultation technique.

In any embodiment disclosed above, the Earth-based GPS receivers capable of measuring SWV is self-calibrating by separating at least one receiver from all other receivers by at least about 500 km. The 500 km separation makes absolute values of SWV measurements possible because the satellite-based GPS transmitter observations are at sufficiently different elevation angles. An alternative calibration technique includes obtaining an independent water vapor measurement local to at least one Earth-based GPS receiver. An independent water vapor measurement can be obtained using a water vapor radiometer or by positioning an Earth-based GPS receiver where there is a stable at or near zero or otherwise known water vapor content such as a mountain top or desert region.

DETAILED DESCRIPTION

Background PWV Information

Figure 1:
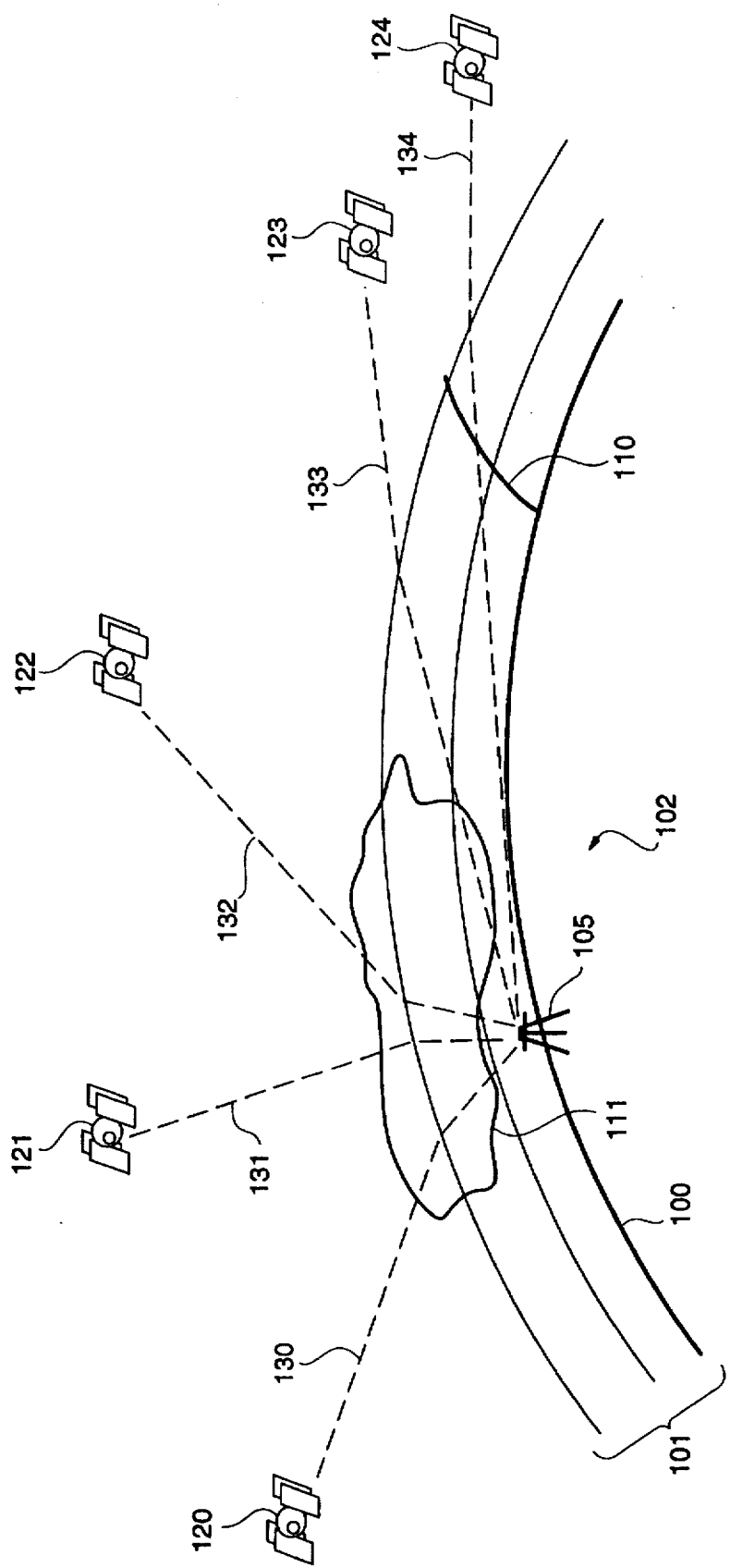
FIG. 1 illustrates one Earth-based GPS receiver for making GPS signal measurements from which excess path delay is determined.

Radio propagation in the atmosphere is retarded (delayed) by the neutral "dry" atmospheric constituents and by atmospheric water vapor. The total atmospheric delay for radio propagation can be determined from GPS measurements by making a stochastic or least squares estimate of the atmospheric delay to optimize a least squares fit of GPS data in position determination. In this process a stratified atmosphere is assumed so that the atmosphere would be azimuthally symmetric about the Earth-based GPS receiver. The resultant delay estimate is expressed as the delay of a vertically propagating radio wave otherwise known as the total zenith delay.

This total zenith delay is due to the refractivity N of the dry atmosphere integrated along a zenith propagation path to the top of the atmosphere:

$$\text{total zenith delay} = \int_{GPS\ \text{antenna}}^{\infty} N_{total} dz \quad (1)$$

where the total refractivity due to the dry and water vapor components can be expressed as a function of the local dry and local vapor densities, the Perfect Gas Constant R, and local temperature of the water vapor:

$$N_{total} = N_{dry} + N_{vapor} = 77.6\rho_{dry}R + 64.8\rho_{vapor}R + 377600\frac{\rho_{vapor}R}{T} \quad (2)$$

where $$N_{dry} = 77.6\rho_{dry}R \quad (3)$$

and $$N_{vapor} = 64.8\rho_{vapor}R + 377600\frac{\rho_{vapor}R}{T} \quad (4)$$

The dry component of zenith delay can be independently measured by determining the total amount of atmosphere above the Earth-based GPS receiver. Determining the total amount of atmosphere above an Earth-based GPS receiver is accomplished by "weighing" the atmosphere with a barometer to obtain a barometric pressure measurement local to the receiver. Subtracting the dry component from the total zenith delay yields the delay due to atmospheric water vapor otherwise known as the zenith wet delay (ZWD).

$$ZWD = \text{total zenity delay} - \text{dry delay} \quad (5)$$

The zenith wet delay is due to the integrated amount of water vapor along the zenith propagation path:

$$ZWD = \int_{GPS\ \text{antenna}}^{\infty} N_{vapor} dz \quad (6)$$

The total amount of water vapor along the zenith path is proportional to the ZWD, with a slight dependence upon the temperature of the water vapor. This temperature dependence can be averaged into a mean vapor temperature which can then be correlated to a surface measurement of ambient temperature. The PWV is therefore be related to ZWD in the following formula:

$$PWV = ZWD \times II \quad (7)$$

where II is a weakly temperature dependent dimensionless constant equal to approximately 0.15. II can be estimated to within about 2% from a surface temperature measurement. However, a uniformly stratified atmosphere and azimuthal symmetry is necessarily assumed in the PWV estimation technique; therefore, no spatial structure of the water vapor can be determined.

SWV Refractivity Measurements - FIG. 1

FIG. 1 illustrates the atmospheric water vapor sensing system of the present invention using the GPS system and one Earth-based GPS receiver to make GPS signal measurements from which excess path delay is determined. Total refractivity due to water vapor is determined from the excess path delay and a specific SWV measurement can be further determined if desired.

The full GPS network of 21 active transmitting satellites and 3 spares is simplified in the present illustration by showing only 5 transmitting satellites 120–124 and one receiver 105 on Earth 100. At any time receiver 105 can receive simultaneous signals 130–134 from GPS satellites 120–124 respectively. Each signal 130–134 is refracted and retarded as it passes through the Earth's atmosphere 101 due to atmospheric constituents including, but not limited to, water vapor. Atmospheric structure 110 is a cold front moving toward receiver 105 while affecting signal 134. Receiver 105 is a standard GPS receiver device that is capable of receiving a plurality of simultaneous GPS signals in a manner well known and practiced in the art. Specifically, the GPS receiver measures phase angles of each of the radio carriers received which are then processed in a novel manner to determine the excess path delay in the GPS signal due to the refraction and retardation of the GPS signals 130–134 along the signal's slant-path due to water vapor. The slant-path being measured follows an acute angular "line-of-sight" path through the atmosphere 101 down to and below a zero angle relative to the geometric horizon. One requirement of a stand-alone Earth-based GPS receiver is that the satellite-based GPS transmitter clock offsets must be known from a source external to the GPS. The external clock offset source can be provided by way of another Earth-based GPS receiver or any other independent source.

Slant-path GPS signals used for SWV and/or refractivity measurements traverse large sections of the atmosphere thereby facilitating measurements over land and water and significantly increasing the atmospheric water vapor sensing system's spatial resolution. For example, a 10 degree slant-path between a GPS transmitter and a receiver relative to the geometric horizon results in a horizontal range of about 34 km through the lower 6 km of the troposphere and the horizontal range of a zero-degree slant path below 6 km is more than 300 km. Because the lower 6 km of troposphere contains approximately 90% of the water vapor in the atmosphere, a single GPS receiver receiving GPS signals from 4 to 12 GPS satellites within its range can determine the distribution of water vapor over a region as large as 600 km diameter. This wide spatial resolution facilitates weather forecasting of atmospheric conditions that are either approaching or retreating relative to a known Earth-based GPS receiver location.

Signals 130–134 illustrate the refracting of the GPS signals due to atmospheric water vapor generally, and specifically due to atmospheric structure in a GPS signal's path such as cold front 110 for GPS signal 134 or cloud cover 111 for GPS signals 130–132. Factoring the refractivity-induced delay measurements directly into a weather forecasting model reveals valuable information about local, regional, and global atmospheric conditions in the present and future. A refractivity-induced delay is affected by many components including, but not limited to, wet delay, hydrostatic delay, and signal error for each slant-path GPS signal. Specifically, water vapor increases the GPS radio propagation along a slant-path by an amount:

$$SWD = \int_{GPS\ antenna}^{GPS\ satellite} N_{vapor} ds \qquad (8)$$

where SWD is the Slant-path Wet Delay along the line-of-sight between the satellite-based GPS transmitter and the Earth-based GPS receiver, and N is defined by equations (2)–(4) above. SWD is related to SWV by:

$$SWV = SWD \times \Pi \qquad (9)$$

where $\Pi$ is a dimensionless conversion factor approximately equal to 0.15. Although $\Pi$ will vary slightly with the elevation angle above the geometric horizon, it can be estimated on average with an accuracy of about 2% based on surface temperature measurements as described above in the zenith case for PWV.

Modeling each GPS receiver's observation in terms of a geometric range such as the observed residual minus the computed residual, produces the wet delay in the direction of the GPS signal. Because the GPS signal's angular elevation, time sent, time received, range, and time delay are known, the total wet delay along a slant-path can be determined. With each Earth-based GPS receiver typically measuring GPS signals at 30 second intervals from as many as about 6 satellite-based GPS transmitters at one time, thousands of measurements are possible per receiver per day.

Figure 2:
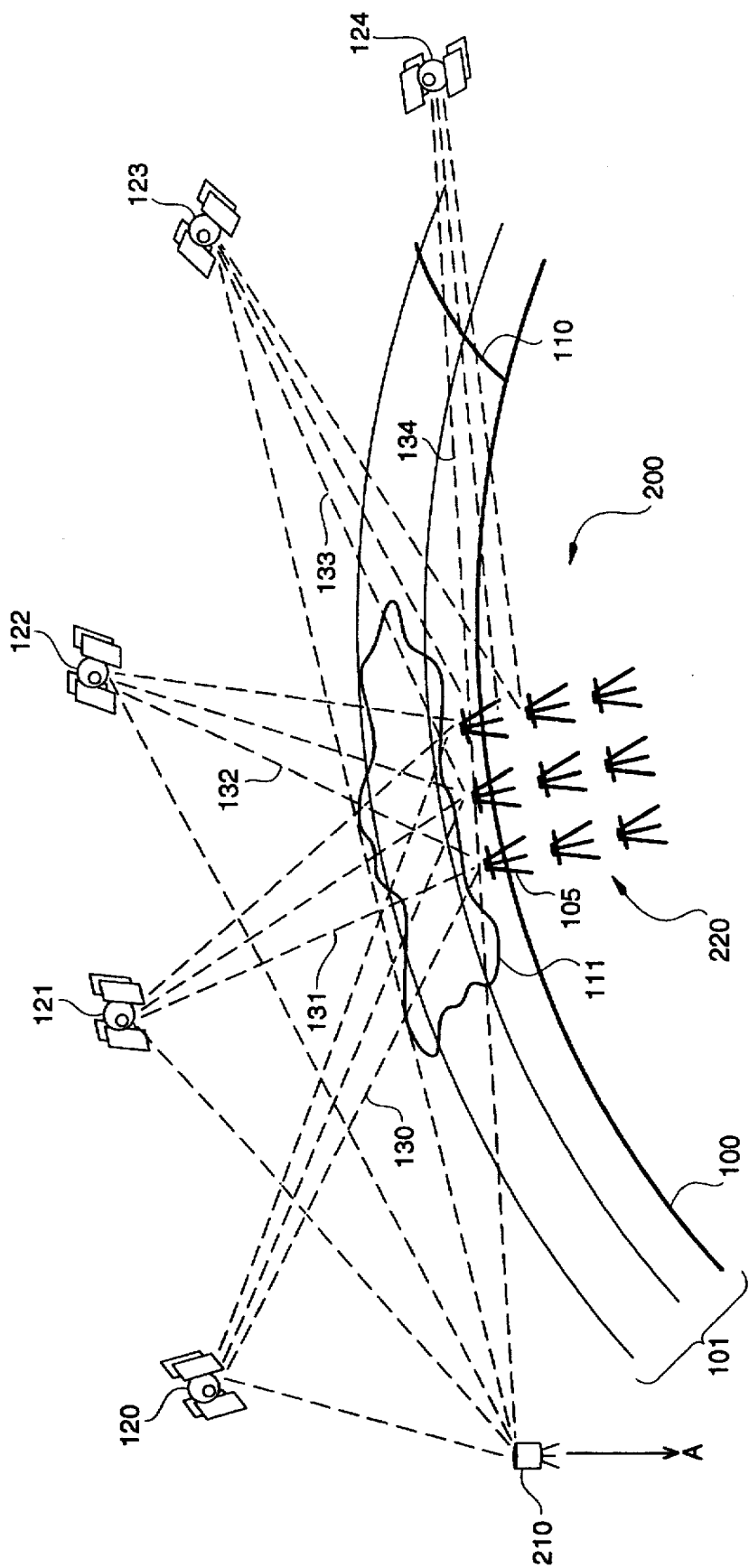
FIG. 2 illustrates a receiver array for making multiple simultaneous GPS signal measurements that can be augmented by either ground-based tomography or radio occultation based tomography.

GPS Receiver Array And Tomography - FIG. 2

FIG. 2 illustrates a preferred embodiment of the atmospheric water vapor sensing system 200. FIG. 2 includes all that is disclosed in FIG. 1 with the addition of a receiver array 220 and a LEO satellite-based GPS receiver 210. Each Earth-based GPS receiver in receiver array 220 functions as described in FIG. 1 and the need for knowing the satellite-based GPS transmitter clock differencing is resolved because there are multiple receiver references available from which the clock differencing can be determined.

The preferred receiver array 220 embodiment is a group of densely spaced Earth-based GPS receivers to improve the spatial resolution over a stand-alone Earth-based GPS receiver. The spacing between receivers in receiver array 220 can be random or in a more organized grid configuration. The receiver array 220 in FIG. 2 is neither intended as a minimum nor maximum density of Earth-based GPS receivers. Rather, the receiver array 220 is intended to illustrate that the more densely spaced the receivers the better the spatial resolution of a defined area. For this reason, the practical number of receivers in receiver array 220 and the physical location of receiver array 220 is determined by the need for higher resolution weather information. Areas where higher resolution weather information can be useful include, but are not limited to, airports, water ports and waterways, cities, major roadways, flood basins or any other populated area whether populated temporarily or permanently.

A standard dual frequency GPS receiver is the preferred receiver type for receiver array 220 because the dual frequency feature removes ionospheric delay. Ionospheric delay is another of the total refractivity delay components that must be removed to determine the refractivity due to water vapor. One alternative to using only the relatively expensive dual frequency GPS receivers in receiver array 220 is to use less expensive single frequency GPS receivers, provided that an independent measure of ionospheric delay is available for each single frequency GPS receiver. Another alternative to using only the relatively expensive dual frequency GPS receivers in receiver array 220 is to space dual frequency GPS receivers by about 10–50 km in receiver array 220 and fill in the less expensive single frequency GPS receivers therebetween at the density necessary to produce the desired resolution of weather information. One requirement of a receiver array containing both single and dual frequency GPS receivers is that the dual frequency GPS receivers must be spaced at intervals that are smaller than the scale of ionospheric structures that would generate unacceptable error. Another low cost receiver implementation alternative includes multiplexing one dual frequency GPS receiver with a grid of receiver antennas, or preprocessing GPS phase data at each remote antenna location prior to collecting the preprocessed data in a central processor.

FIG. 2 illustrates two techniques for obtaining atmospheric tomography. The first technique is receiver array tomography. Receiver array tomography relies on the simultaneous intersecting of GPS signals each being received along a slant-path by individual Earth-based GPS receivers in receiver array 220. In the preferred embodiment the GPS signals will intersect within several Scale Heights of water vapor in the atmosphere. The Scale Height of atmospheric water vapor is defined as a height into the atmosphere above the Earth's surface where one half of the total atmospheric water vapor is contained in the height. Because the Scale Height of the Earth's atmosphere water vapor is about 2 km, Earth-based GPS receivers must be spaced at approximately 2 km intervals or less to provide adequate GPS signal overlap. The resulting tomography is a three-dimensional refractivity map containing information relating to the horizontal distribution of water vapor for use in local, regional, and global scale weather forecasting. Tomography utilizes numerous receivers, each performing the tasks discussed in the text accompanying FIG. 3 down to and including step 333 to make three-dimensional tomographic images of atmospheric refractivity, or step 336 to make a three-dimensional image of atmospheric water vapor. These numerous vector measurements of refractivity or SWV are then mathematically inverted to recover the three-dimensional tomographic image of the refractivity or water vapor field otherwise known generally as refractivity field tomography and atmospheric water vapor tomography respectively.

The second technique for obtaining atmospheric tomography is based on the existing radio occultation technique. Radio occultation requires at least one LEO GPS receiver 210 and the constellation of satellite-based GPS transmitters represented by the satellite-based GPS transmitters 120–124. In operation, the LEO GPS receiver 210 receives a GPS signal 134 that becomes a long horizontal limb path as the LEO GPS receiver 210 goes behind the Earth in direction "A" relative to satellite-based GPS transmitter 124 that is traveling in a much higher and therefore slower orbit. In the moments prior to the eclipse of satellite-based GPS transmitter 124, the GPS signal 134 transects the atmosphere 101, and specifically structure 111, which can provide useful refractivity and/or SWV measurements. However, the GPS signal 134 along a long horizontal limb path is not particularly useful because the LEO-measured refractivity by itself is smeared along an approximately 200 km section of the atmosphere 101, which inhibits the GPS signal's useful horizontal resolution. Although the horizontal resolution of GPS signal 134 along its long horizontal limb path has heretofore been improved due to the intersecting zenithal GPS signals of the prior art that provided reference points along GPS signal 134, the horizontal resolution of GPS signal 134 is significantly improved in regions over receiver array 220 due to the more numerous slant-path GPS signals from respective satellite-based GPS transmitters 120–123 that intersect the long horizontal limb path of GPS signal 134 between LEO GPS receiver 210 and satellite-based GPS receiver 124. The result of the intersecting slant-path GPS signals is a more robust three-dimensional map of water vapor in the atmosphere known as atmospheric water vapor tomography.

An additional severe limitation exists for the radio occultation tomography technique in that the LEO GPS receiver 210 is available for a sounding over receiver array 220 at irregular periods when the LEO GPS receiver 210 orbit is properly positioned opposite a satellite-based GPS transmitter such as 124. Because it is not cost effective to place and maintain hundreds of LEO GPS receivers in orbit to provide continuous radio occultation coverage over receiver array 220, the preferred embodiment combines the receiver array tomography with the radio occultation tomography for a continuous and robust three-dimensional map of water vapor in the region over receiver array 220 also known generally as atmospheric water vapor tomography or refractivity field tomography.

Self calibration and absolute tropospheric estimations of PWV and SWV on a millimeter scale are possible for receiver array 220 provided there at least two Earth-based GPS receivers separated from each other by at least 500 km. The 500 km requirement is necessary because the elevation angle between any two Earth-based GPS receivers in receiver array 220 and any one GPS transmitter 120–124 would otherwise be nearly indistinguishable. With separation of at least 500 km, ZWD can be computed from barometric pressure and GPS signal measurements alone. Other receiver calibration alternatives are available that obtain accurate ZWD estimates within receiver array 220 if receiver separation of less than 500 km exists between at least two Earth-based GPS receivers. A first alternative to the separation requirement is to independently determine ZWD at at least one Earth-based GPS receiver site in receiver array 220 by way of a water vapor radiometer or other water vapor sensing device capable of measuring integrated water vapor with a resolution at or about 1–2 mm. A ZWD estimate can then be obtained based on the difference between the reference site measurements and the second receiver site measurement added to the absolute value of the SWV measure from any Earth-based GPS receiver in receiver array 220.

A final calibration alternative for Earth-based GPS receivers separated by less than 500 km in receiver array 220 is to place at least one Earth-based receiver in a location known to have consistently zero or otherwise stable and known humidity levels and water vapor distributions.

Figure 3:
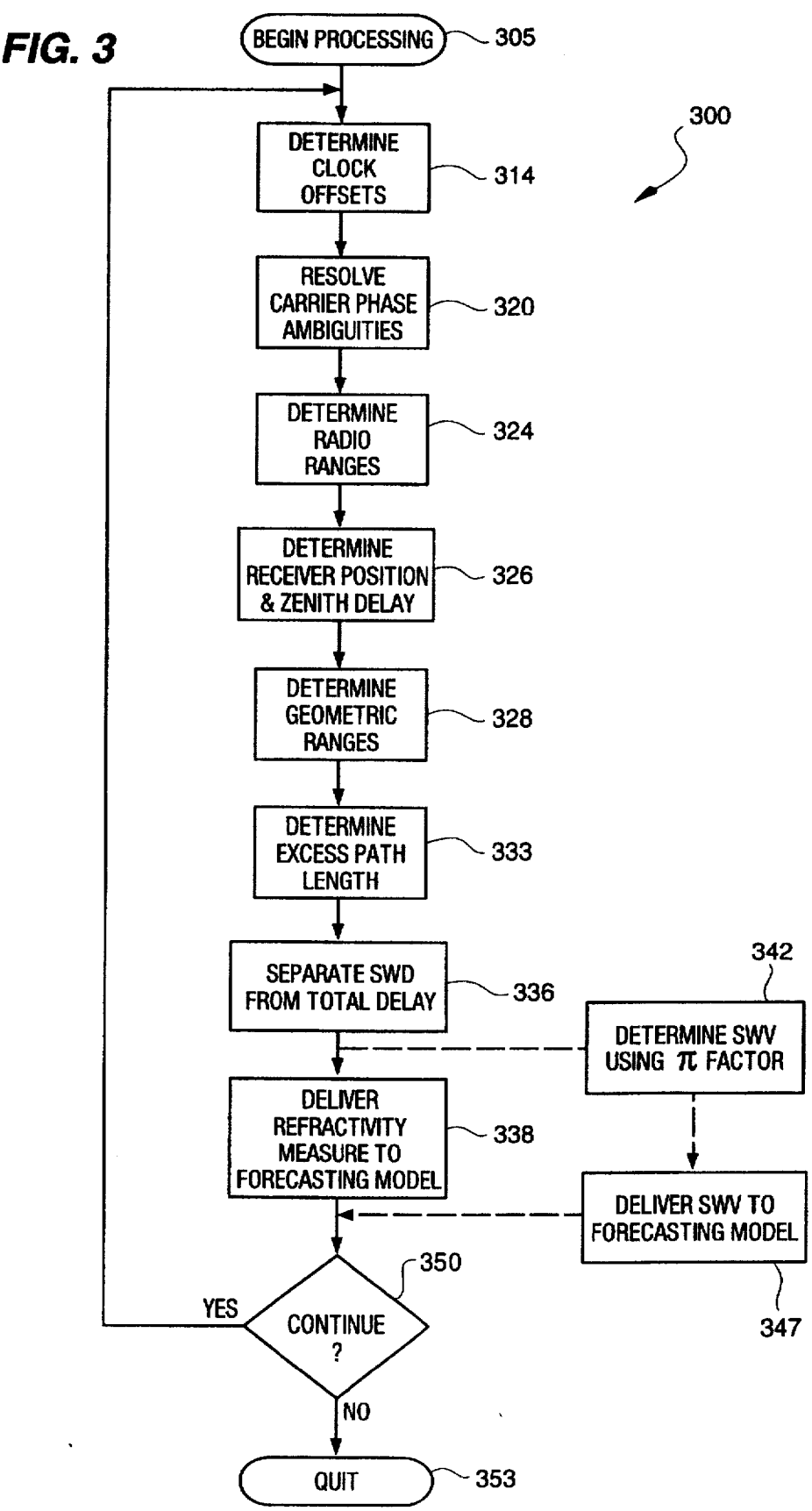
FIG. 3 illustrates, in flow diagram form, the steps taken in processing GPS signal measurements as in put to weather forecasting models.

Determining Excess Path Delay and SWV - FIG. 3

FIG. 3 illustrates the operational steps 300 in flow diagram form for determining excess path delay and SWV. The operational steps 300 begin at step 305 with an operational network of satellite-based GPS transmitters 120–124 and at least one operational Earth-based GPS receiver 105 and preferably a receiver array 220 capable of maintaining continuous signal contact with at least one satellite-based GPS transmitter 120–124. The operational steps 300 assume the use of low multi-path GPS receiver antennas and a low multi-path antenna environment. Multi-path is a highly localized error caused by signal reflections from objects located at or near the antenna of a GPS receiver and is often accompanied by receiver antenna phase delay variations that repeat in sidereal time. Objects known to cause multi-path errors include, but are not limited to, the ground below a receiver antenna, trees, buildings, and terrain proximate to and higher than the GPS receiver antenna.

The clock offset for each satellite-based GPS transmitter is determined at step 314. Disparities between transmitter and receiver clocks are also resolved at step 314 to accurately determine signal delay and subsequently the geometric range between the satellite-based GPS transmitter and each Earth-based GPS receiver. Resolving clock differences is important because receiver clock resolution is approximately $10^{-8}$ and transmitter clock resolution is approximately $10^{-10}$, and even a one nanosecond $10^{-9}$ difference in clocks can equal one foot in positioning or an equivalent loss in SWV accuracy.

The location of an Earth-based GPS receiver such as 105 is determined by steps 314–326, based on information available in GPS signals 130–134. High precision positioning is attained by determining the number of carrier wavelengths occurring between an active GPS transmitter and an Earth-based GPS receiver. The wavelength determination includes the integer number of wavelengths that have occurred, and any residual fractional wavelength. Determining the position of an Earth-based GPS receiver includes compensating for orbital variations of individual satellite-based GPS transmitters, multi-path noise, atmospheric delay, and ionospheric refractivity.

Orbital variation error for the satellite-based GPS transmitters typically contribute to no more than about 0.5 mm error in SWV and are eliminated by using orbit predictions or real-time orbit estimations based on published orbit information or triangulation from at least four Earth-based GPS receivers. Error due to multi-path noise is eliminated by observing the multi-path corrupted signal that repeats in sidereal time over several days. Other alternatives to eliminating multi-path noise include, but are not limited to, improving receiver antenna hardware, and operating the Earth-based GPS receivers in areas free of reflective surfaces. Ionospheric error is easily eliminated although it is highly variable, because the error is substantially proportional to the inverse square of the GPS signal's frequency so that the error is correctable by correlating the two signal frequencies over which a GPS signal is transmitted.

Carrier phase ambiguities are resolved at step 320. A carrier phase ambiguity is the uncertainty in the integer number of wavelengths or carrier cycles occurring in the distance between a satellite-based GPS transmitter and an Earth-based GPS receiver. Resolving carrier phase ambiguity is accomplished by observing the time series of GPS observables and determining the integer values required to fulfill the distance constraints as each satellite-based GPS transmitter progresses in its respective orbit. Determining the integer value required to fulfill the distance constraint plus determining the residual phase angle of the GPS signal's carrier phase yields the radio range between a satellite-based GPS transmitter and an Earth-based GPS receiver. The radio range is the GPS signal distance along the refracted and retarded slant-path between the satellite-based GPS transmitter and the Earth-based GPS receiver.

The position of an Earth-based GPS receiver is determined with centimeter accuracy at step 326 using methods established for high-accuracy GPS geodesy. The, geometric range along the slant-path between a satellite-based GPS transmitter and an Earth-based GPS receiver is determined at step 328. The geometric range is determined by calculating the straight-line distance between the satellite-based GPS transmitter position and the now-known Earth-based GPS receiver position.

The excess path length along the slant-path between the satellite-based GPS transmitter and the Earth-based GPS receiver is determined at step 333. The excess path length for any slant-path signal is the difference of the radio range and the geometric range as determined from steps 324 to 328. The Earth-based GPS receiver position and zenith signal delay over the receiver are determined at step 326. The total refractivity measurement is proportional to the excess path length along the slant-path as determined at step 336, and it is the total refractivity measurement that is the input directly into a weather forecasting model at step 338. Alternatively or in combination with the total refractivity measurement input directly into a forecasting model, SWV can be determined at step 342 based on the excess path length from step 328 by subtracting out the hydrostatic delay determined from a barometric weighing of the atmosphere, and multiplying the remaining wet delay by the Π factor. SWV can also be input directly into a weather forecasting model or other statistical model at step 347. Weather forecasting models capable of accepting either a refractivity or SWV measurement include, but are not limited to, the Pennsylvania State MM5 Mesoscale Model by Pennsylvania State and the National Center for Atmospheric Research, Boulder, Colo., the RUC/MAPS model by the National Oceanic and Atmospheric Administration (NOAA), Boulder, Colo., or the Forecast Systems Laboratory Local Analysis and Prediction System (LAPS) model by NOAA, Boulder, Colo. By assimilating SWV data into these or similar models, water vapor profiles can be obtained from the model forecast. Refractivity input is the preferred input to weather forecasting models because it is a more precise measure of the present atmospheric condition local to a slant-path than the additional step of obtaining a SWV measurement can provide. At decision step 350, the system determines whether to continue with step 314 or quit at step 353.

Figure 4:
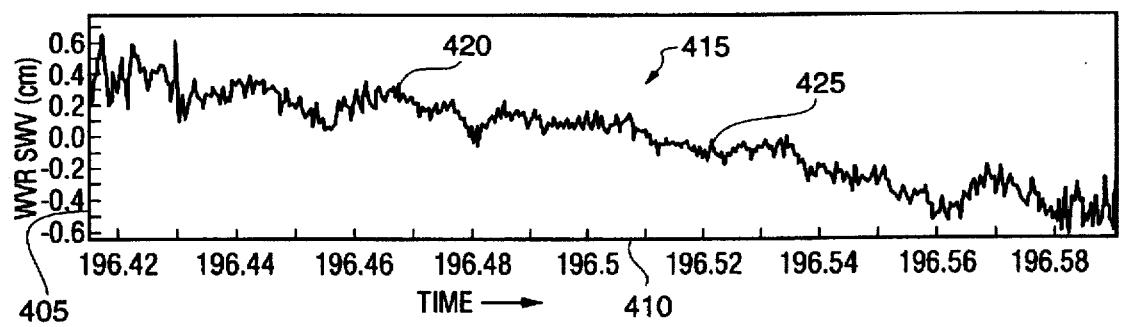
FIG. 4 illustrates refractivity and SWV measurement results using the present invention.
Figure 5:
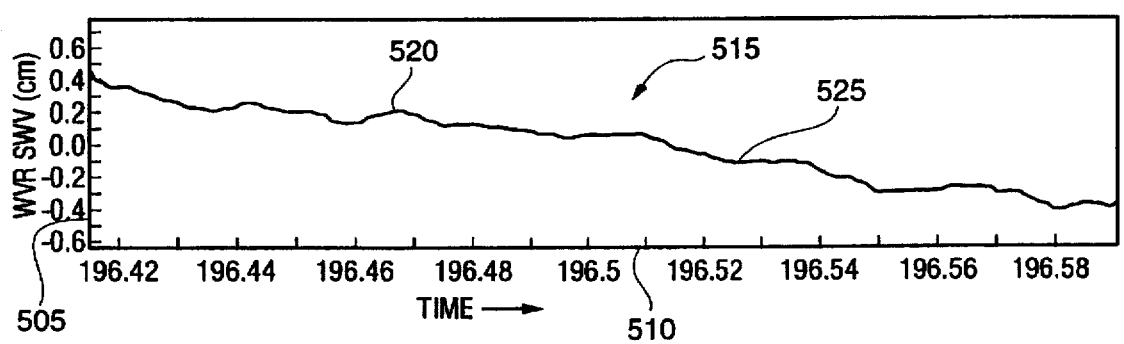
FIG. 5 illustrates refractivity and SWV measurement results using a pointed water vapor radiometers.

Field Test Results - FIG. 4 and 5

FIG. 4 illustrates the SWV measurements taken by two Earth-based GPS receivers viewing up to 8 to 12 satellite-based GPS transmitters at a time. The vertical axis 405 notes the difference in SWV in centimeters based on double differenced GPS signal observations. Double differencing is a technique used in GPS geodesy for removing common mode errors. The technique involves determining the difference in SWV for the GPS signals from at least two satellite-based GPS transmitters that are simultaneously received by two independent Earth-based GPS receivers, and further determining the difference in SWV for the GPS signals as between the two Earth-based GPS receivers. The horizontal axis 410 notes time from Julian day 196.42 to Julian day 196.58 as the at least two satellite-based GPS transmitters traverse the sky. The SWV data 415 shows a steady decline in double difference in water vapor content from about 0.4 cm on day 196.42 to about −0.4 cm on day 196.59. Data features 420 and 425 are significant features in the overall SWV data 415 that are useful in comparing to the SWV data 515 in FIG. 5.

FIG. 5 illustrates the confirming SWV measurements taken by conventional pointed Water Vapor Radiometers (WVRs). The vertical axis 505 notes the difference in SWV in centimeters based on double differenced WVR signal observations taken proximate to the Earth-based GPS receivers in FIG. 4. The horizontal axis 510 notes time in Julian days as in FIG. 4. The SWV data 515 confirms the steady decline in double difference in water vapor content from about 0.4 cm on day 196.42 to about −0.4 era on day 196.59 as seen in the FIG. 4 SWV data 415 taken by the Earth-based GPS receivers. Data features 520 and 525 in the overall SWV data 515 illustrate a general correspondence with data features 420 and 425 in FIG. 4. Further, the 0.9 mm rms difference in SWV as between the GPS and WVR results illustrated in FIG. 4 and FIG. 5 respectively, demonstrates the viability of the GPS based SWV sensing system.

Summary

The atmospheric water vapor sensing system of the present invention measures refractivity and SWV of slant-path GPS signals transmitted by any one of a plurality of satellite-based GPS transmitters and received by a plurality of Earth-based GPS receivers in a receiver array. Although specific embodiments are disclosed herein it is expected that those skilled in the art can and will design alternative atmospheric water vapor sensing systems that are within the scope of the following claims literally or under the Doctrine of Equivalents.

What is claimed is:

1. An atmospheric water vapor sensing system for use in forecasting atmospheric conditions in Earth's atmosphere, said system comprising:

at least one Earth-based receiver, at least one satellite-based transmitter, and a signal on a slant-path therebetween; and means for determining a refractivity measurement of said signal based on an excess path delay of said signal induced by weather related atmospheric constituents along said slant-path.

2. A system according to claim 1 wherein said signal along said slant-path is at an acute angular elevation relative to Earth's geometric horizon selected from at least one of a group consisting of: a positive elevation above said geometric horizon and a negative elevation below said geometric horizon.

3. A system according to claim 1 wherein said signal is a global positioning satellite signal between a satellite-based GPS transmitter and an Earth-based GPS receiver.

4. A system according to claim 1 including:

means for inputting said refractivity measurement of said signal directly into a weather forecasting model to predict weather conditions proximate to said slant-path.

5. A system according to claim 4 including:

means for determining a slant-path water vapor measurement along at least one portion of said slant-path within said Earth's atmosphere based on said refractivity measurement of said signal; and means for inputting said slant-path water vapor measurement directly into a weather forecasting model to predict weather conditions proximate to said slant-path.

6. A system according to claim 5 including:

means for outputting a water vapor profile from said weather forecasting model.

7. A system according to claim 4 including:

means for compensating for error in said slant-path due to atmosphere asymmetry, ionospheric interference, and multi-path noise, wherein said means for compensating is based on said refractivity measurements and is selected from at least one of a group consisting of: stochastic methods and least squares.

8. A system according to claim 7 including:

means for detecting repetitive sidereal multipath patterns in said signal; and means for compensating for said repetitive sidereal multipath patterns in said signal by sidereal time synchronization for one of said at least one Earth-based receiver.

9. An atmospheric water vapor sensing system for use in forecasting atmospheric conditions in Earth's atmosphere, said system comprising:

a receiver array having a plurality of Earth-based receivers therein, a plurality of satellite-based transmitters distributed in individual Earth orbits, and a plurality of signals each having individual slant-paths between said plurality of satellite-based transmitters and said receiver array; and means for measuring an excess path delay for each of said plurality of signals induced by atmospheric constituents along each of said individual slant-paths.

10. A system according to claim 9 including:

means for determining a tomography in a region of said atmosphere substantially over said receiver array based on said plurality of signals intersecting in said region of said atmosphere substantially over said receiver array, wherein said tomography is of at least one tomography type selected from a group consisting of: refractivity field tomography and atmospheric water vapor tomography.

11. A system according to claim 9 including:

means for receiving at least one of said plurality of signals with at least one low earth orbiting satellite-based receiver, wherein said at least one of said plurality of signals is a long horizontal limb path that transects said Earth's atmosphere;

means for determining a tomography in said region of said atmosphere substantially over said receiver array based on said plurality of signals intersecting in said region substantially over said receiver array in combination with said long horizontal limb path that transects said Earth's atmosphere substantially over said receiver array, wherein said tomography is of at least one tomography type selected from a group consisting of: refractivity field tomography and atmospheric water vapor tomography.

12. A system according to claim 9 including:

means for calibrating said plurality of Earth-based receivers in said receiver array.

13. A system according to claim 12 wherein said means for calibrating includes:

a first one of said plurality of Earth-based receivers separated from a second one of said plurality of Earth-based receivers.

14. A system according to claim 12 wherein said means for calibrating includes:

means for establishing an integrated water vapor benchmark with a water vapor sensing radiometer proximate to at least one of said plurality of Earth-based receivers.

15. An atmospheric water vapor sensing system for use in forecasting atmospheric conditions in Earth's atmosphere, said system comprising:

a receiver array having a plurality of Earth-based receivers therein, a plurality of satellite-based transmitters distributed in individual Earth orbits, and a plurality of signals each having individual slant-paths between said plurality of satellite-based transmitters and said receiver array;

means for measuring an excess path delay for each of said plurality of signals induced by atmospheric constituents along each of said individual slant-paths;

means for determining a refractivity measurement for each of said plurality of signals based on said excess path delay; and means for inputting said refractivity measurement of said signal directly into a weather forecasting model to predict weather conditions proximate to said slant-path.

16. A system according to claim 15 including:

means for determining a tomography in a region of said atmosphere substantially over said receiver array based on said plurality of signals intersecting in said region of said atmosphere substantially over said receiver array, wherein said tomography is of at least one tomography type selected from a group consisting of: refractivity field tomography and atmospheric water vapor tomography.

17. A method for using an atmospheric water vapor sensing system for forecasting atmospheric conditions in Earth's atmosphere, said atmospheric water vapor sensing system having at least one Earth-based receiver, at least one satellite-based transmitter, and a signal on a slant-path therebetween, said method comprising:

determining a refractivity measurement for said signal based on an excess path delay of said signal induced by atmospheric constituents along said slant-path, wherein said signal along said slant-path is at an acute angular elevation relative to Earth's geometric horizon selected from at least one of a group consisting of: a positive elevation above said geometric horizon and a negative elevation below said geometric horizon.

18. A method according to claim 17 wherein said signal is a global positioning satellite signal between a satellite-based GPS transmitter and an Earth-based GPS receiver.

19. A method according to claim 17 including:

inputting said refractivity measurement of said signal directly into a weather forecasting model to predict weather conditions proximate to said slant-path.

20. A method according to claim 19 including:

determining a slant-path water vapor measurement along at least one portion of said slant-path within said Earth's atmosphere based on said refractivity measurement of said signal; and inputting said slant-path water vapor measurement directly into a weather forecasting model to predict weather conditions proximate to said slant-path.

21. A method according to claim 20 including:

outputting a water vapor profile from said weather forecasting model.

22. A method according to claim 19 including:

compensating for error in said slant-path due to atmospheric asymmetry, ionospheric interference, and multi-path noise, wherein said means for compensating is based on said refractivity measurements and is selected from at least one of a group consisting of: stochastic methods and least squares.

23. A method according to claim 22 including:

detecting repetitive sidereal multipath patterns in said signal; and compensating for said repetitive sidereal multipath patterns in said signal by sidereal time synchronization for one of said at least one Earth-based receiver.

24. A method for using an atmospheric water vapor sensing system for forecasting atmospheric conditions in Earth's atmosphere, said atmospheric water vapor sensing system having a receiver array having a plurality of Earth-based receivers therein, a plurality of satellite-based transmitters distributed in individual Earth orbits, and a plurality of signals each having individual slant-paths between said plurality of satellite-based transmitters and said receiver array, said method comprising:

measuring an excess path delay for each of said plurality of signals induced by atmospheric constituents along each of said individual slant-paths, wherein each of said plurality of signals along each of said individual slant-paths is at an acute angular elevation relative to Earth's geometric horizon selected from at least one of a group consisting of: a positive elevation above said geometric horizon and a negative elevation below said geometric horizon.

25. A method according to claim 24 including:

determining a tomography in a region of said atmosphere substantially over said receiver array based on said plurality of signals intersecting in said region of said atmosphere substantially over said receiver array, wherein said tomography is of at least one tomography type selected from a group consisting of: refractivity field tomography and atmospheric water vapor tomography.

26. A method according to claim 24 including:

receiving at least one of said plurality of signals with at least one low earth orbiting satellite-based receiver, wherein said at least one of said plurality of signals is a long horizontal limb path that transects said Earth's atmosphere; and determining a tomography in said region of said atmosphere substantially over said receiver array based on said plurality of signals intersecting in said region substantially over said receiver array in combination with said long horizontal limb path that transects said Earth's atmosphere substantially over said receiver array, wherein said tomography is of at least one tomography type selected from a group consisting of: refractivity field tomography and atmospheric water vapor tomography.

27. A method according to claim 24 including:

calibrating said plurality of Earth-based receivers in said receiver array.

28. A method according to claim 27 wherein said step of calibrating includes:

operating a first one of said plurality of Earth-based receivers in a location at least about 500 km away from a second one of said plurality of Earth-based receivers.

29. A method according to claim 27 wherein said step of calibrating includes:

establishing an integrated water vapor benchmark with a water vapor sensing radiometer proximate to at least one of said plurality of Earth-based receivers.

30. A method for using an atmospheric water vapor sensing system for forecasting atmospheric conditions in Earth's atmosphere, said atmospheric water vapor sensing system having a receiver array having a plurality of Earth-based receivers therein, a plurality of satellite-based transmitters distributed in individual Earth orbits, and a plurality of signals each having individual slant-paths between said plurality of satellite-based transmitters and said receiver array, said method comprising:

measuring an excess path delay for each of said plurality of signals induced by atmospheric constituents along each of said individual slant-paths;

determining a refractivity measurement for each of said plurality of signals based on said excess path delay; and inputting said refractivity measurement of said signal directly into a weather forecasting model to predict weather conditions proximate to said slant-path.

31. A method according to claim 30 including:

determining a tomography in a region of said atmosphere substantially over said receiver array based on said plurality of signals intersecting in said region of said atmosphere substantially over said receiver array, wherein said tomography is of at least one tomography type selected from a group consisting of: refractivity field tomography and atmospheric water vapor tomography.

\* \* \* \* \*

UNITED STATES PATENT AND TRADEMARK OFFICE
CERTIFICATE OF CORRECTION

PATENT NO. : 5,675,081
DATED : October 7, 1997
INVENTOR(S) : Fredrick Stuart Solheim, Randolph H. Ware, Christopher Dale Alber and Christian Rocken It is certified that error appears in the above-identified patent and that said Letters Patent is hereby corrected as shown below:

Column 5, line 23, delete "receivers" and substitute --receiver system--;

Column 6, line 33 (equation 5), delete "zenity" and substitute --zenith--;

Column 10, line 51, delete "multi-path" and substitute --multipath--;

Column 10, line 52, delete "multi-path" and substitute --multipath--;

Column 10, line 52, delete "Multi-path" and substitute --Multipath--;

Column 10, line 56, delete "multi-path" and substitute --multipath--;

Column 11, line 14, delete "multi-path" and substitute --multipath--;

Column 11, line 21, delete "multi-path" and substitute --multipath--;

Column 11, line 22, delete "multi-path" and substitute --multipath--;

Column 11, line 24, delete "multi-path" and substitute --multipath--;

Column 11, line 51, delete "The, geometric" and substitute --The geometric--;

UNITED STATES PATENT AND TRADEMARK OFFICE
CERTIFICATE OF CORRECTION

PATENT NO. : 5,675,081
DATED : October 7, 1997
INVENTOR(S) : Fredrick Stuart Solheim, Randolph H. Ware, Christopher Dale Alber and Christian Rocken It is certified that error appears in the above-identified patent and that said Letters Patent is hereby corrected as shown below:

Column 12, line 55, delete "era" and substitute --cm--;

Column 13, line 47, delete "multi-path" and substitute --multipath--;

Column 15, line 39, delete "multi-path" and substitute --multipath--;

Signed and Sealed this

First Day of September, 1998

Attest:

Attesting Officer

BRUCE LEHMAN

Commissioner of Patents and Trademarks